Aug. 13, 1929.　　　　O. BUSCH　　　　1,724,392
CIRCULAR KILN
Filed May 14, 1927　　　6 Sheets-Sheet 1

Inventor:
Otto Busch

Aug. 13, 1929.  O. BUSCH  1,724,392
CIRCULAR KILN
Filed May 14, 1927  6 Sheets-Sheet 4

Inventor:
Otto Busch.

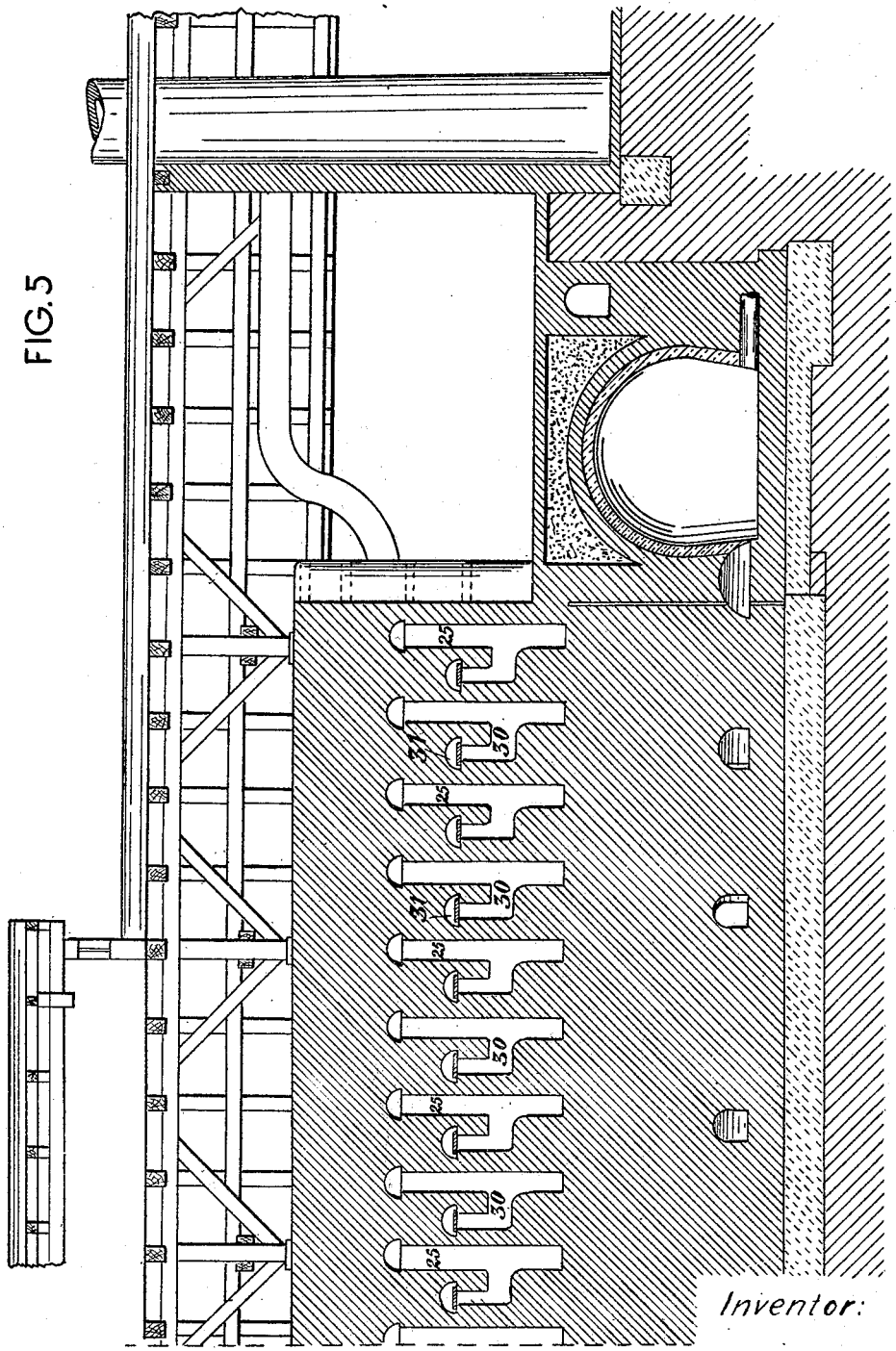

Aug. 13, 1929.  O. BUSCH  1,724,392
CIRCULAR KILN
Filed May 14, 1927  6 Sheets-Sheet 6
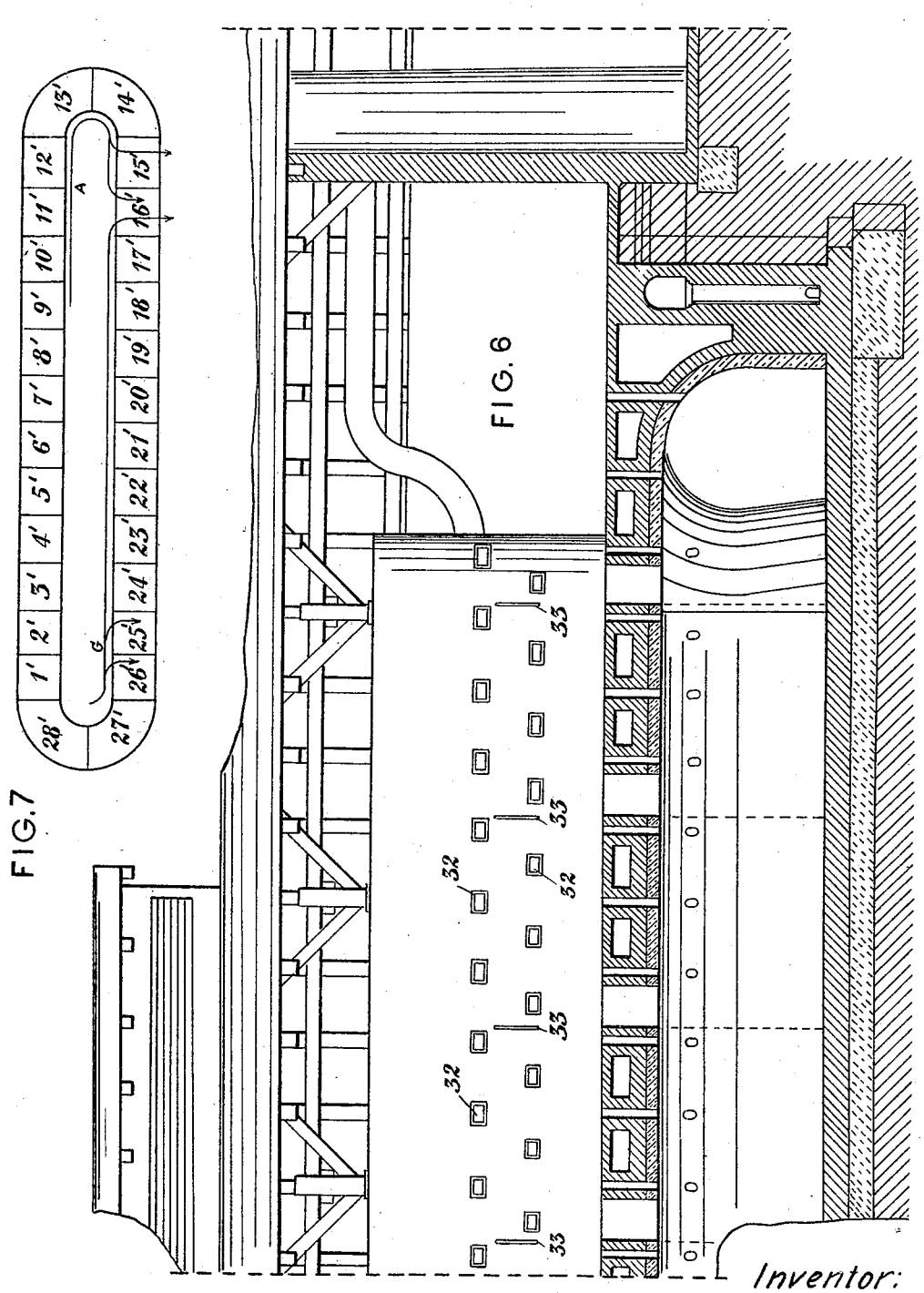
Inventor:
Otto Busch Patented Aug. 13, 1929.

1,724,392

UNITED STATES PATENT OFFICE.

OTTO BUSCH, OF LIEBERTWOLKWITZ, GERMANY.

CIRCULAR KILN.

Application filed May 14, 1927, Serial No. 191,473, and in France June 10, 1926.

This invention relates to a circular kiln for the baking of bricks, ceramic products and the like, and its object is to provide a kiln construction wherein the heat is utilized in a particularly economic manner. With this object in view the invention consists in the provision of an underground kiln provided into a plurality of kiln chambers over which a drying shed is located, said kiln being furnished with heat-interchanging flues and surrounded entirely by a discharge flue, means being provided for leading flue gases from the chambers through the heat-interchanging flues and through the discharge flue into the drying shed and also for leading air into the chambers through the heat-interchanging flues.

Figure 1:
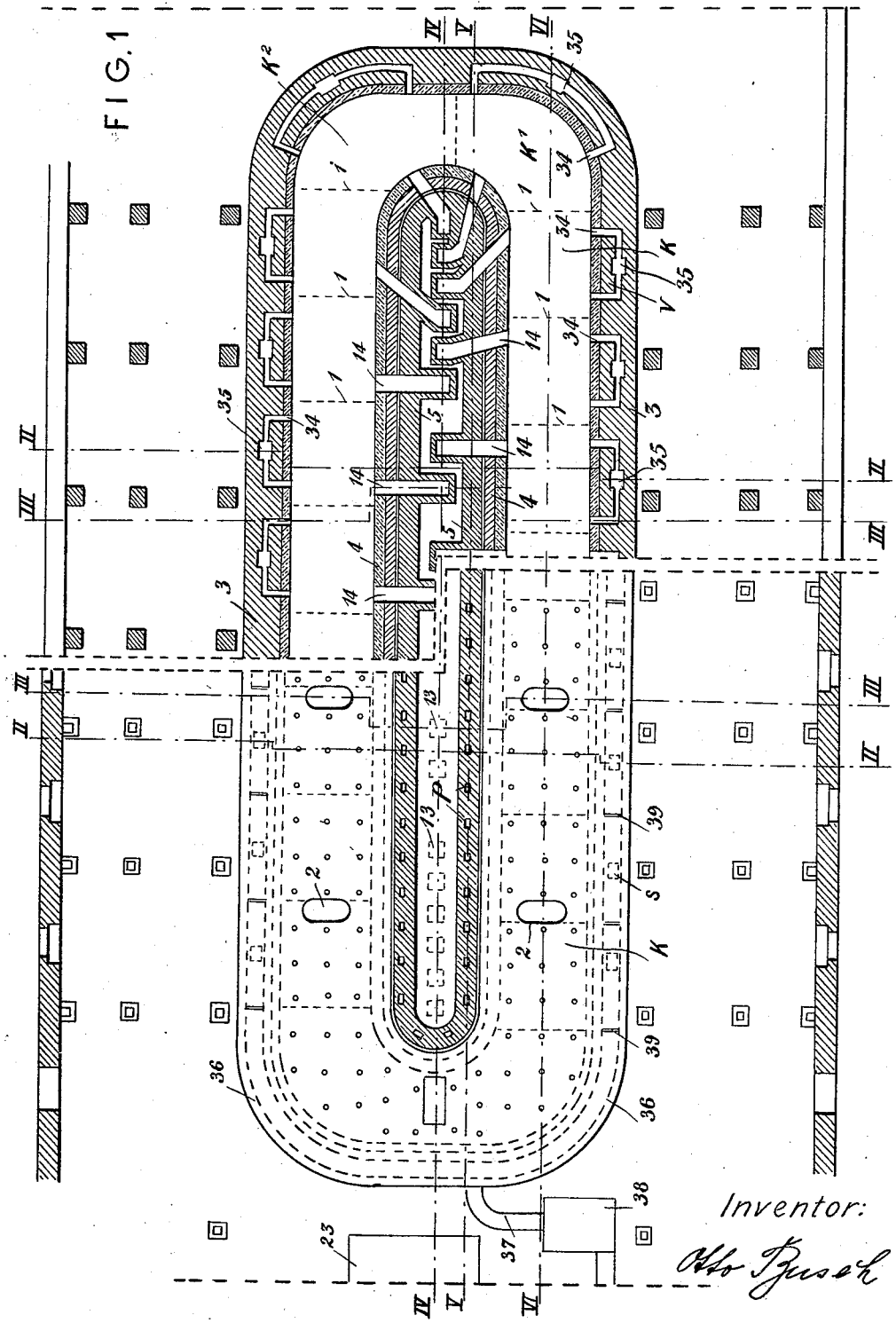
Figure 2:
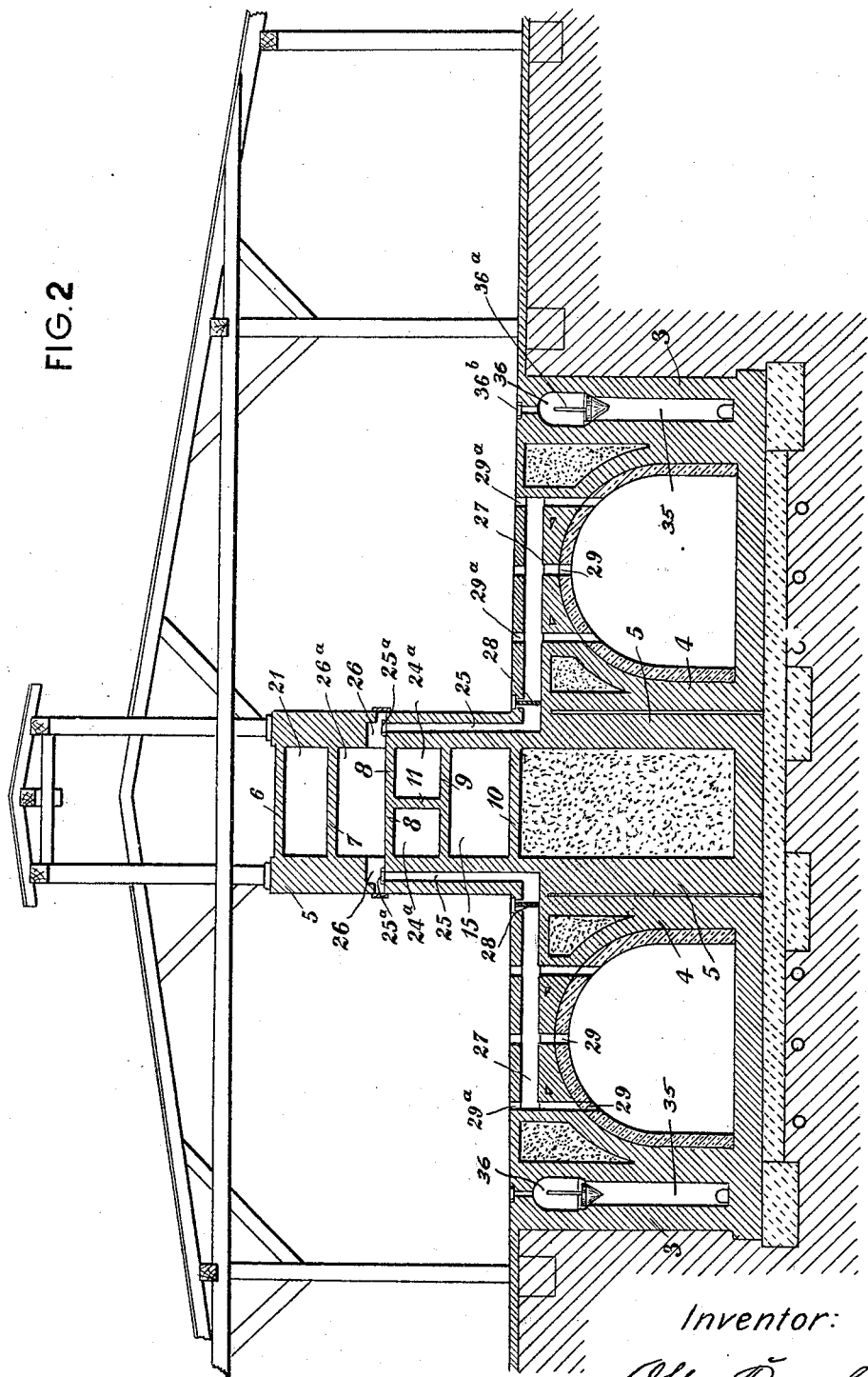
Figure 3:
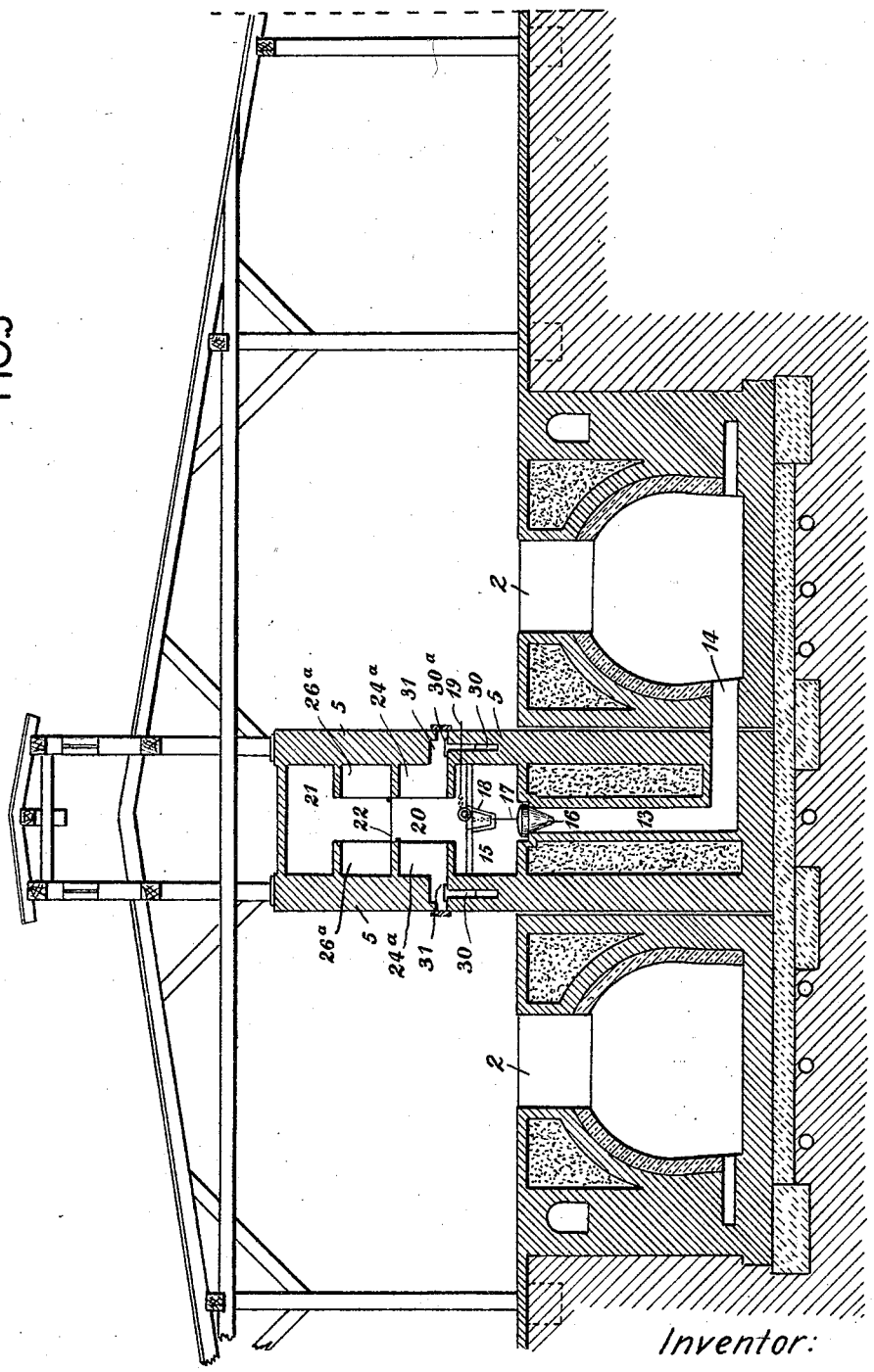
Figure 4:
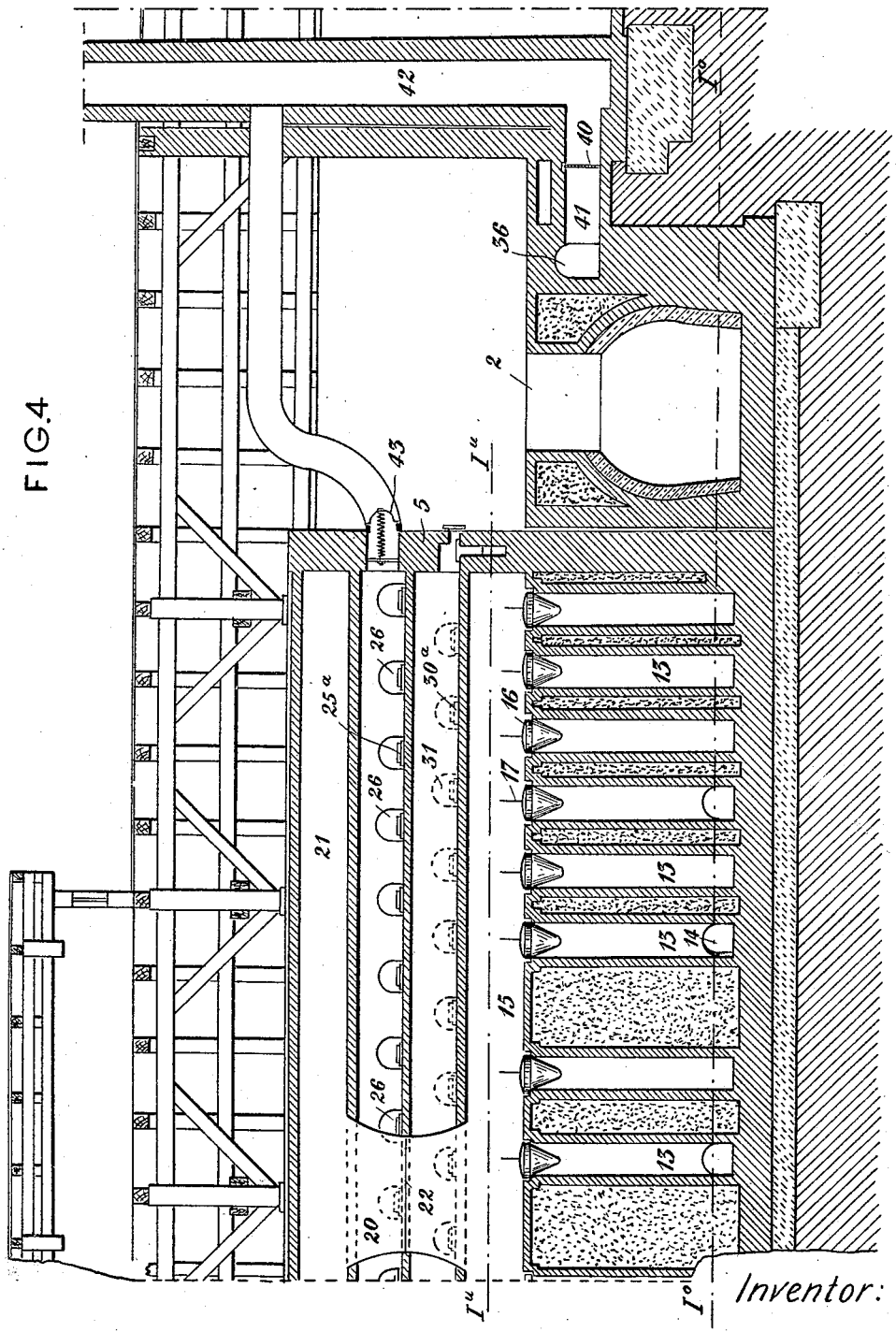

Fig. 1 of the accompanying drawings represents a horizontal section partly on the line I$u$—I$u$ and partly on the line I$o$—I$o$ of Fig. 4, Fig. 2 is a vertical cross-section on an enlarged scale on the line II—II of Fig. 1, Fig. 3, a vertical cross-section on the line III—III of Fig. 1, Fig. 4, a vertical longitudinal section on the line IV—IV of Fig. 1, Fig. 5, a vertical longitudinal section on the line V—V of Fig. 1, Fig. 6, a vertical longitudinal section on the line VI—VI of Fig. 1, and Fig. 7, a diagram illustrating the action of the kiln.

The kiln is built on the rectangular system, i. e., the chimneys at one end of the same. The kiln shown by way of example is divided into 28 kiln chambers. The dotted lines in Fig. 1 indicates the limits of the individual chambers in the longitudinal direction of the kiln. Every other chamber has a man-hole 2. The whole of the kiln enclosed between the walls 3, as shown in Figs. 2 to 6, is built underground. The inner vertical walls 4 are, as shown in the cross-sections, divided by air shafts from the vertical walls 5. The latter are carried beyond the kiln cover, and the parts extended above the cover are connected with one another by thin cross-partitions 6—10. The walls 8 and 9 are connected to each other by a vertical partition 11. This partition does not reach right to the ends of the superstructure formed by the walls 5, and the two flues produced by the partition 11 are therefore in communication with each other at the ends so as to form a single closed flue 24$^a$. In the vertical, longitudinal median plane of the kiln vertical gas discharge flues 13 are provided, one for each chamber. Each flue 13 communicates through a horizontal flue 14 with its kiln chamber. All the flues 13 open at the top into a horizontal flue 15; they are, however, provided with valves 16 whereby they can be closed when required. Each valve is suspended from a rod 17 (Fig. 3) mounted in a guide. A chain 18 connects the rod 17 with a rod 19 which is carried through the wall 15. The rod 19 is pulled for lifting the valve. Means are provided for arresting the rod 19 with the valve in raised position. The flue 15 is connected with the flue 21 through several flues 20 formed by walls of sheet metal. Each flue 20 contains a flap valve 22 which can be opened and closed at pleasure. The flue 21 is connected with a space 23 (Fig. 1) in which there is a fan. This fan drives the drawn-in gases into the flue 26$^a$. In the walls 5 (Fig. 2) vertical flues 25 are provided which open at the top into valve spaces 26 and at the bottom into horizontal flues 27. Dampers 28 are built into the flue 27. For each kiln chamber there are three flues 25 and as many flues 27. Each flue 27 communicates through three vertical flues 29 (Fig. 2) with the respective kiln chamber, and each flue 29 has an extension 29$^a$ which opens through the cover of the flue 27 into the atmosphere. Each flue 25 (Fig. 2) can be closed at the top by means of a flap valve 25$^a$.

Each flue 25 is in open communication with an angular flue 30 (Figs. 3 and 5) which opens into a valve chamber 31. The flue 30 can also be closed at the top by means of flap valves 30$^a$ (Figs. 3 and 5). The valve chambers or spaces 26 and 31 are accessible from the outside through apertures which are normally closed by insets 32 (Figs. 3 and 6). The valve spaces 26 (Fig. 2) are in open communication with the flue 26$^a$. For each kiln chamber, the flue 24$^a$ is provided with a damper 33 (Fig. 6) which can be opened from the outside.

Two horizontal flues 34 (Fig. 1) lead from the bottom of each kiln chamber to a vertical flue 35. At the upper end of each flue 35 a valve 36$^a$ is provided which can be opened from the outside. These valves are accessible through apertures 36$^b$. The flue 35 opens at the top into a horizontal flue 36 which is carried around the entire kiln. Adjoining the flue 36 is a flue 37 (Fig. 1) which leads to a fan in the chamber 38. The flue 36 is furnished with numerous dampers 39 whereby the direction of travel of the gases can be determined. The flue 36 is further connected to the chimney 42 through a flue 41 which can be closed by means of a damper 40. The flue 26ª is also connected with the chimney 24 over a valve 43 (Fig. 4) which opens when the pressure exceeds a given magnitude.

The action is as follows:

The kiln is supposed to have 28 kiln chambers 1'—28' as shown in the diagram in Fig. 7. Two chambers, for instance 27' and 28', are exposed to full heat and have the highest temperature. In the chambers 25' and 26', which are being preheated, the temperature is lower. The goods in the eight chambers 17' to 24' are simply exposed to heat obtained from the chambers which are being cooled, for instance 1' to 9'. In the chamber 15' an initial warming up, just enough to drive away the bulk of the water, is effected. The heat for this warming up is obtained from one or more of the chambers that are being cooled, for instance from the chamber 9'. A somewhat higher temperature, obtained from a mixture of air and flue gases, is produced in the chamber 16'. The air is taken from the same chamber or chambers which supply heat to the chamber 15' while the flue gases are obtained from the chambers 27' and 28' through the medium of the fan in the space 23. The chambers 10' to 14' are being emptied, and the goods in the chambers 1' to 9' are being cooled.

Atmospheric air is admitted to all the chambers in which cooling takes place, the air being drawn in through the holes 2 by the fan situated in the space 38. The air enters the respective flues 27 through the apertures 29 of the nine chambers, the apertures 29ª being closed. The dampers 28 are raised to allow the air to enter the adjoining flues. The upper ends of these flues are closed by the valves 25ª. Since each chamber, as shown in Fig. 2, has three rows of apertures 29 and 29ª, since three such rows in the transverse direction of the kiln communicate with a common flue 27, and since nine chambers are being cooled, twenty-seven flues 25 will be available for the admission of air into these chambers. The flues 30 adjoining these twenty-seven flues (Fig. 5) are opened by the extension of their valves. Thus the air can enter the flue 24ª which adjoins the open flues 30. The valves of the flues 30 of the two chambers 15' and 16' are also open so that air from the flue 24ª can flow through the flues 30 into the adjoining flues 25. From the latter the air enters the flues 27, the dampers 28 of which are also extended, and arrives finally through the apertures 29 in the chambers 15' and 16'. The air passes through the chambers 15' and 16' in downward direction and enters the flue 34 whence it passes through the appertaining flues 35, the valves 35ª of which are open (Fig. 2), into the flue 36 which is carried around the entire kiln. The flue 36 is, as previously mentioned, connected to the fan which is housed in the chamber 38 and which drives the air into the large drying shed situated above the kiln chambers. By closing the corresponding dampers 33 (Fig. 6), that part of the flue 24ª which leads off the air from the chambers that are being cooled, can be separated from the remaining part of this flue.

The air from those chambers which are not supplying the chambers 15' and 16', is sucked through that part of the flue 24ª which is divided off by the closing of the two dampers. This greater part of the air is led to the chambers 17' to 24' in the same manner as air is delivered to the chambers 15' and 16', and the air from the chambers 17' to 24' is also led through the respective flues 34 and 35 into the flue 36 which is carried around the kiln and which communicates with the fan in the chamber 38.

Part of the hot air from the chambers which are being cooled, is led through the respective flues 25, 27 and 29 to the chambers subjected to the greatest heat. The valves 25ª of the respective flues 25 are raised. The air is moved by the suction effect of the fan in the space 23. The air passes downwards through the chambers subjected to the greatest heat, and the gases are discharged from these chambers through the flues 13 and 14, after the valves have been opened, and into the flue 15. Through that part of the flue 20 which is at the greatest distance from the chambers 27' and 28', the hot flue gases are led into the flue 21. From the latter the gases flow to the fan situated in the space 23 and this fan drives the gases into the flue 26ª. The flues 25 which belong to the chambers 16', 25' and 28' are open at the top, while the flues 30 which belong to the chambers 25' and 26' are closed. The gases from the chamber 26ª can therefore pass into the preheating chambers 25' and 26' and into the chambers 16. From these chambers the gases flow through the flues 34, 35 and 36 to the fan in the chamber 38 which fan drives them into the drying shed above the kiln.

The arrow A in Fig. 7 shows the path of the air from the last of the cooled chambers to the chambers 15' and 16'. The arrow G shows the path of the gas from the fan of the space 23 to the chambers 25', 26' and 16'.

I claim:

1. A circular kiln divided into a plurality of kiln chambers and having a discharge flue communicating with said chambers and extending around the entire kiln, means for closing the communication between each particular chamber and the discharge flue, a centrally disposed superstructure on said kiln having a series of flues, means for setting said latter flues separately into communication with different kiln chambers through the roofs of the latter, the kiln being provided with closable apertures through which the kiln chambers can communicate through the roofs with the atmosphere, and a fan communicating with one of the flues in the super-structure for supplying gas to the latter and to the different chambers.

2. A kiln as claimed in claim 1 wherein the flues of the super-structure are arranged in a vertical grouping.

3. A kiln as claimed in claim 1 wherein the flues of the super-structure are arranged in a vertical grouping, the super-structure being provided with passages leading through intermediate flues from an upper flue in the group to a lower one.

4. The kiln structure claimed in claim 1 in combination with valves whereby the communication between the kiln chambers and the flues of the super-structure can be controlled, the super-structure being provided with closable apertures through which said valves are accessible from the outside.

5. A kiln as claimed in claim 1 wherein some of the flues of the super-structure communicate through right-angled passages.

6. The kiln claimed in claim 1 in combination with a second fan communicating with the discharge flue for exhausting gases from the latter.

OTTO BUSCH.